United States Patent
Payraudeau et al.

[11] 3,720,326
[45] March 13, 1973

[54] PROCESS AND INSTALLATION FOR CONSTRUCTING BUILDINGS PARTICULARLY DWELLINGS

[75] Inventors: Hubert Michel Henri Auguste Payraudeau; Henri Andre Charles Joseph Payraudeau, both of Les Brouzils, France

[73] Assignee: Technab, Les Brouzils (Vendee), France

[22] Filed: July 6, 1970

[21] Appl. No.: 52,266

[52] U.S. Cl.................214/1 H, 214/44 R, 52/749, 52/64, 52/90
[51] Int. Cl................................................B65g 7/04
[58] Field of Search .......214/38.42, 1 H, 75 H, 44 R; 238/13; 52/122, 143, 749, 173, 79

[56] References Cited

UNITED STATES PATENTS

| | | | |
|---|---|---|---|
| 3,236,400 | 2/1966 | Turturro | 214/1 H |
| 2,832,298 | 4/1958 | Ambli | 214/38 CA |
| 1,341,996 | 6/1920 | Plucienski | 214/38 CA |

*Primary Examiner*—Albert J. Makay
*Assistant Examiner*—John Mannix
*Attorney*—Wolf, Greenfield & Sacks

[57] ABSTRACT

This invention relates to a process and installation for constructing dwellings, in which a framework is made of rails, the outer walls and partitions being brought on to the site in a lorry or container, connecting parts being fitted between the framework and the lorry or container, the partitions and walls being slid between them and fixed permanently on the spot, allowing very advanced factory finishing of walls and partitions.

14 Claims, 11 Drawing Figures

PROCESS AND INSTALLATION FOR CONSTRUCTING BUILDINGS PARTICULARLY DWELLINGS

The present invention relates to a construction process for buildings, particularly dwellings, allowing completely finished partitions to be factory-produced.

In so-called prefabricated construction, the system is known of making a skeleton grouping the framework elements and constructing separating partitions between them, incorporating doors or windows as needed.

Erection of these partitions and, often, of the facades, causes a considerable loss of time on the site, particularly in the various handlings when, for example, factory-made facades are brought on to the building site.

To the extent that the facades or partitions are factory-made, the various manipulations necessary to put them into position are liable to engender incidents causing some degree of deterioration preventing too advanced a finish (fixing of doors and windows, wallpaper, etc.).

To the extent that the separating partitions are constructed on the spot, it is afterwards necessary for the finishing specialists to stay on the site, leading to loss of time causing an increase in the cost price.

The present invention aims at remedying these drawbacks and to this end relates to a process for constructing buildings, more particularly dwellings, characterized by the erection of gallows made up of vertical and roof framework elements, these gallows being linked together by rails, enabling completely factory-produced and finished partitions and facades to be brought and handled easily, these partitions being fitted with rollers which slide inside the rails forming part of the framework; the partitions and facades may thus be entirely factory-produced before being placed in position in the framework.

The invention also relates to an installation for implementing the process, characterized by means being provided to move the partition components from the lorry or container to the gallows forming the framework of the building.

A process and installation in accordance with the invention are illustrated as a non-limiting example in the attached drawings in which.

Figure 1:
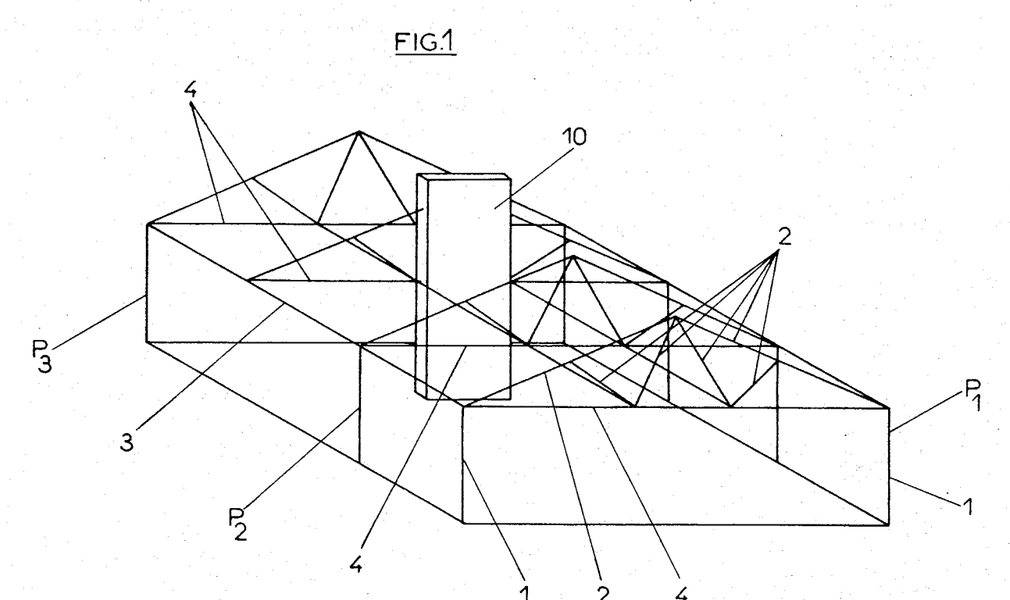
FIG. 1 shows, in perspective, the framework of a building to illustrate the various applications defined in the following drawings.

As shown in FIG. 1, the invention consists of putting in place gallows grouping vertical elements 1 and roof elements 2.

Several gallows P1, P2 and P3 are put in place, one after the other, and stabilized by connecting parts 3.

The horizontal parts of each gallows, i.e. parts 4 and connecting parts 3, are made up of profiles forming rolling rails.

Figure 2:
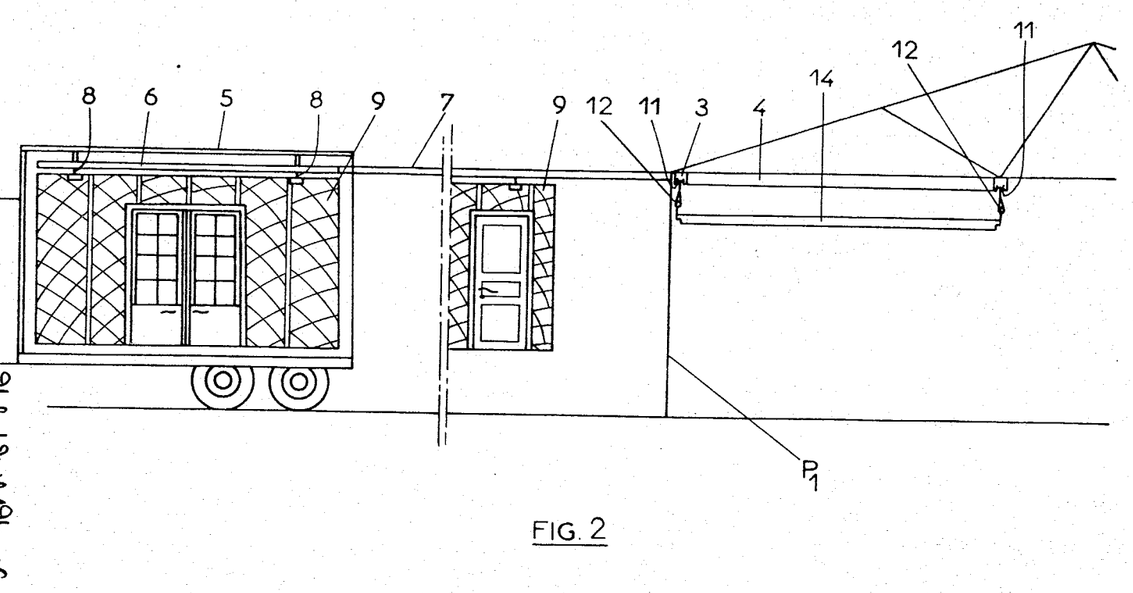
FIG. 2 illustrates the process for putting into position partitions from a transport lorry.

The partitions and facades are factory-produced up to their final stage (coating with paint or wallpaper, door, glaziery, electrical installations, etc.) and brought in lorries shown diagrammatically as 5 in FIG. 2.

Each of these lorries is fitted with a plurality of rails 6 parallel to each other. Each rail is fixed to the roof of the lorry body and supports the partitions for finishing the building.

The rails 6 fixed to the roof of the lorry body are connected by intermediary rails to rails 3 and 4 forming part of the initially molded skeleton.

The upper edge of each partition is fitted with rollers 8 sliding inside the rails 6. Thus it is possible, by sliding the finished partitions 9 along the rails 6 fixed in the lorry and along the connecting rails 7, to bring them to their respective places in the facade or inside the framework made from gallows P1, P2 and P3.

First of all, the chimney 10 and the sanitary and kitchen elements will have been put into place in the framework.

The ceilings 14 will be brought in the same way as the partitions 9; each ceiling will be supported by rollers 11 connected, for example, to jacks shown diagrammatically as 12, these jacks also being fitted on the vertical partitions 9 and adjustable to allow the partitions to be trued up in relation to each other and the ceilings.

It will then only be necessary to join the internal partitions to the facades and to the ceilings; the building will then be completed, with all secondary operations such as internal and external finishing, adjustment of doors and windows and electrical installations having been done in the factory.

Figure 3:
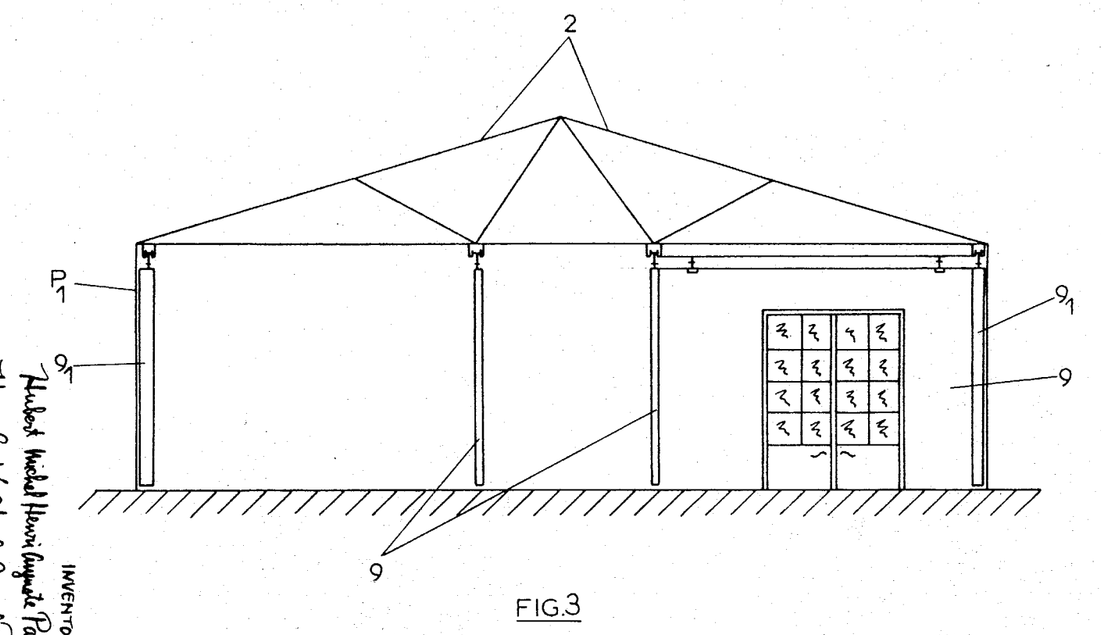
FIG. 3 shows the framework with partitions and facades in position.

FIG. 3 shows an internal partition 9 put into position and the facades 9₁.

Figure 4:
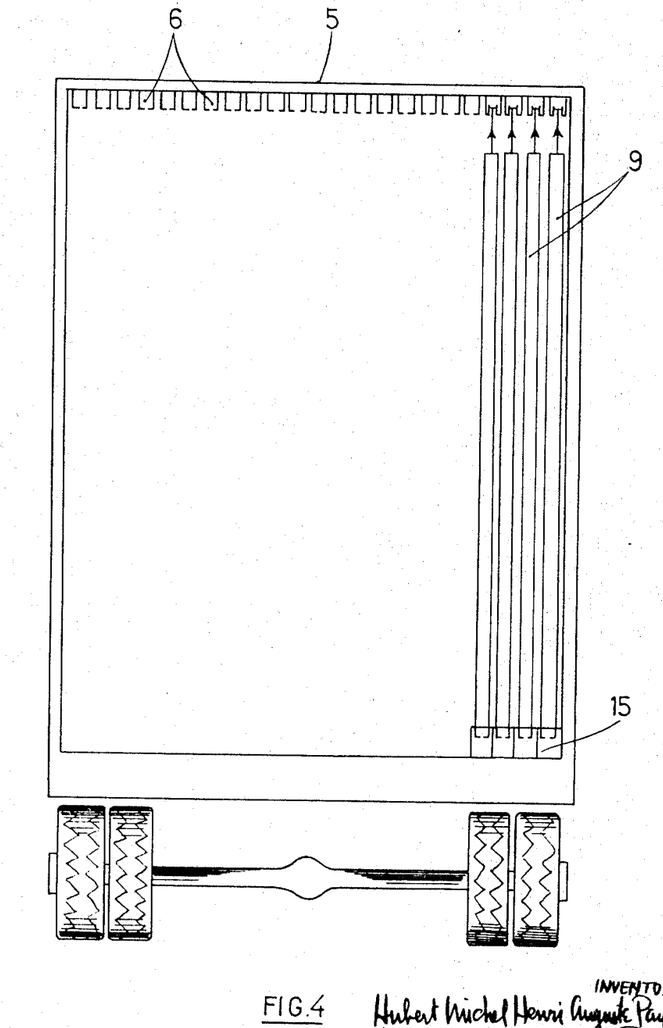
FIG. 4 shows the rear of a lorry transporting finished partitions.

FIG. 4 shows the rear of a lorry 5 with, in the upper part, the rails 6 supporting the partitions or facades 9, the latter being stabilized by a wedge 15 of flexible material, preventing knocks during transportation which could damage the panel surfaces.

Figure 5:
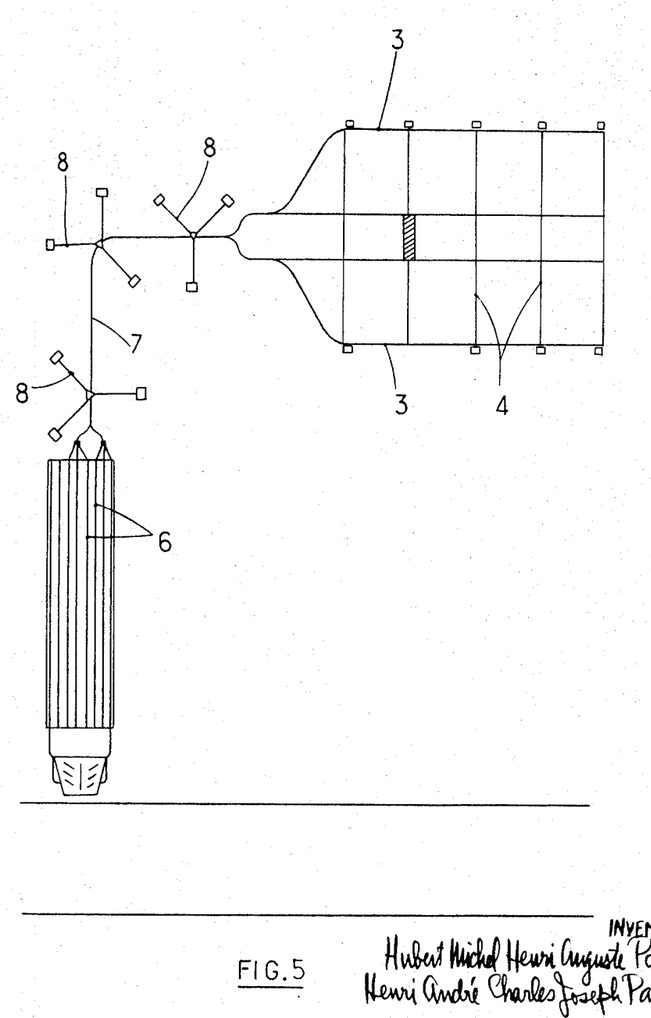
FIG. 5 shows an installation diagram with the connecting rails placed between the lorry and the erected gallows.

FIG. 5 shows, seen from above, one embodiment for connecting the rails 6 fixed inside the lorry and the rails 3 and 4 forming part of the gallows.

The intermediary rails 7 have one end fitted into a case 16 made up of two parts connected together by bolts 17.

The upper part of this case forms a groove into which fits a portion of rail 18 attached to a platform 19 connected to the stabilizing feet 20.

The height of each of the feet can be adjusted by means of a series of holes 21 with play taken up by a threaded sleeve 22.

Figure 6:
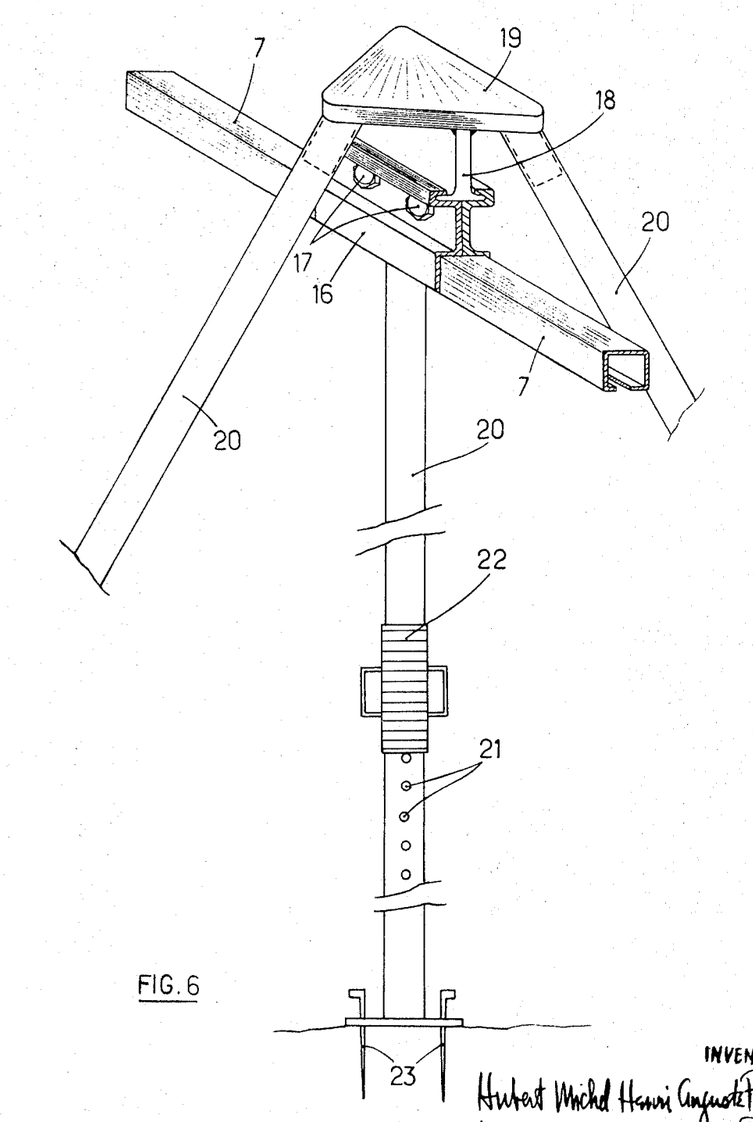
FIG. 6 shows a support for the rails which guide the finished partitions.

Fixing means 23 are provided at the base of each foot to stabilize the assembly (see FIG. 6).

Application of this process results in considerable advantages leading to reduction of the cost price of a prefabricated building.

It is obvious that this handling process can be applied, as stated above, to all factory-finished partitions whatever their composition (for example, heavy concrete partitions, or others).

Figure 7:
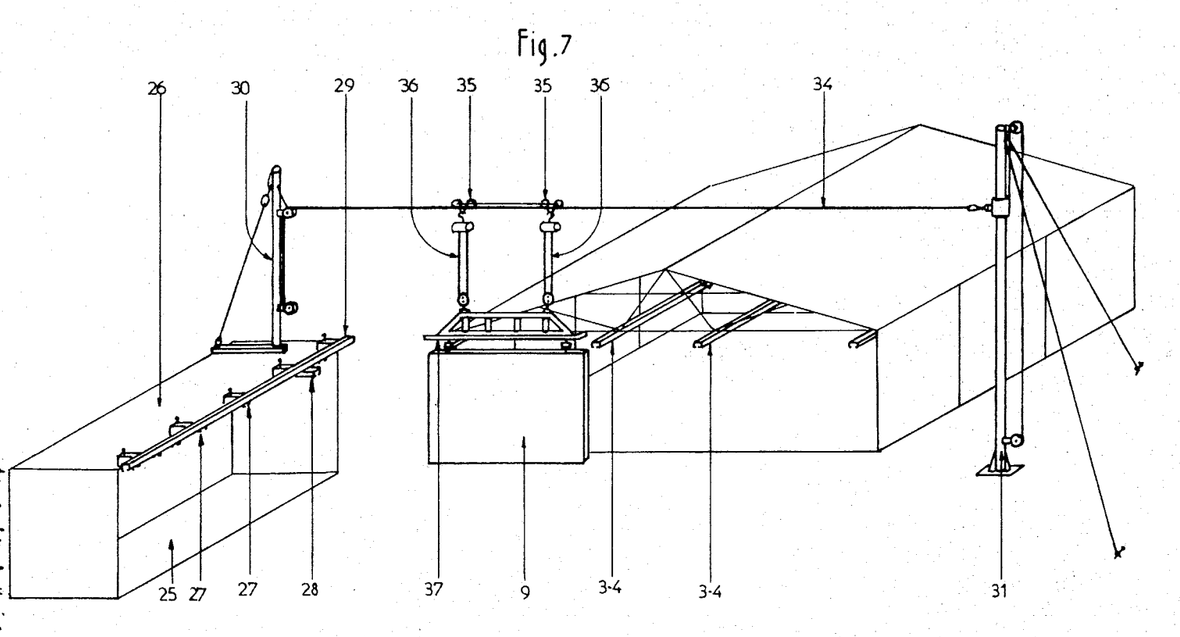
FIG. 7 is a perspective view of one installation embodiment allowing construction components to be brought from the container to the framework.

Another embodiment is shown in FIG. 7. It makes use of a container 25 unloaded on site, open all along one side and having on its roof 26, inside the lorry, sections of rails 27 placed transversally in relation to the longitudinal axis of the container. These rails are positioned parallel to each other and each one supports the construction components.

A transfer element 28 sliding in a rail 29 perpendicular to rails 27 allows the construction components to be taken out of the container and brought to all points along the transfer element 28.

A post 30 is mounted on the container, a second post 31 being fixed beyond the building in such a way that, with rope 34 connecting posts 30 and 31, the building components may be taken from the transfer element and directed towards rails 3–4 put into position in the building. A line of runners 35 is linked by cables 36 to a support 37, shown in detail in FIG. 8.

Figure 8:
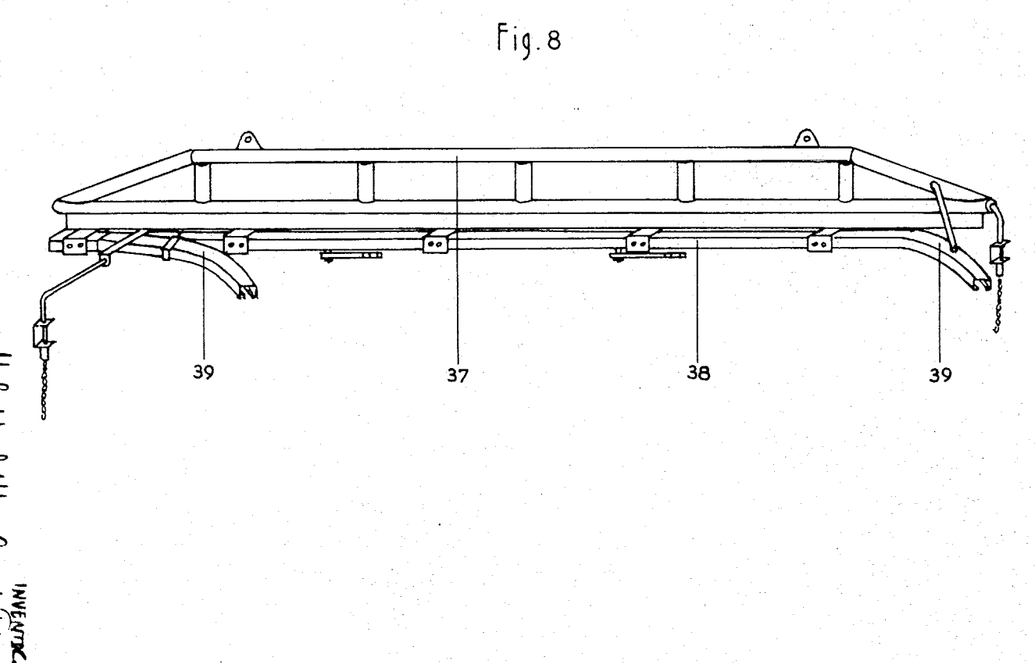
FIG. 8 is a detailed view of the element carrying the construction components during their transfer from the container to the framework.

As shown in this Figure, a rail 38 fitted at each end with portions of curved rails 39 oriented identically, is mounted on the support 37.

The height of the support 37 may be adjusted by the cables 36 linking it to the line of runners 35.

The end of the portion of rail 38 fixed to the support 37 is adapted to enable it to be connected rapidly to transfer element 28.

Any construction component may slide from transfer element 28 on the support, by means of runners; the unit is slid along the rope 34 and, after adjusting the height of the support, this adjustment serving to put the curved portions of rail and the rails in the framework end to end, the runners forming part of the construction components 9 are pushed into the curved portions of rail and enter the rails in the framework, where they are guided to their permanent position.

Figure 9:
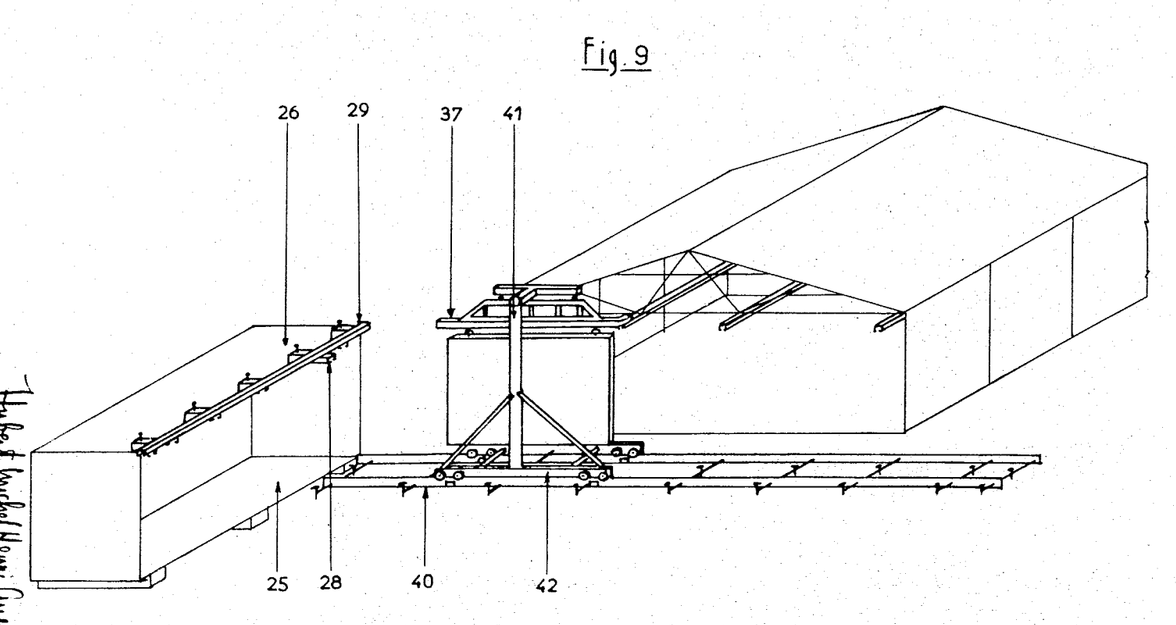
FIGS. 9, 10 and 11 show different installation embodiments for transferring construction components.
Figure 10:
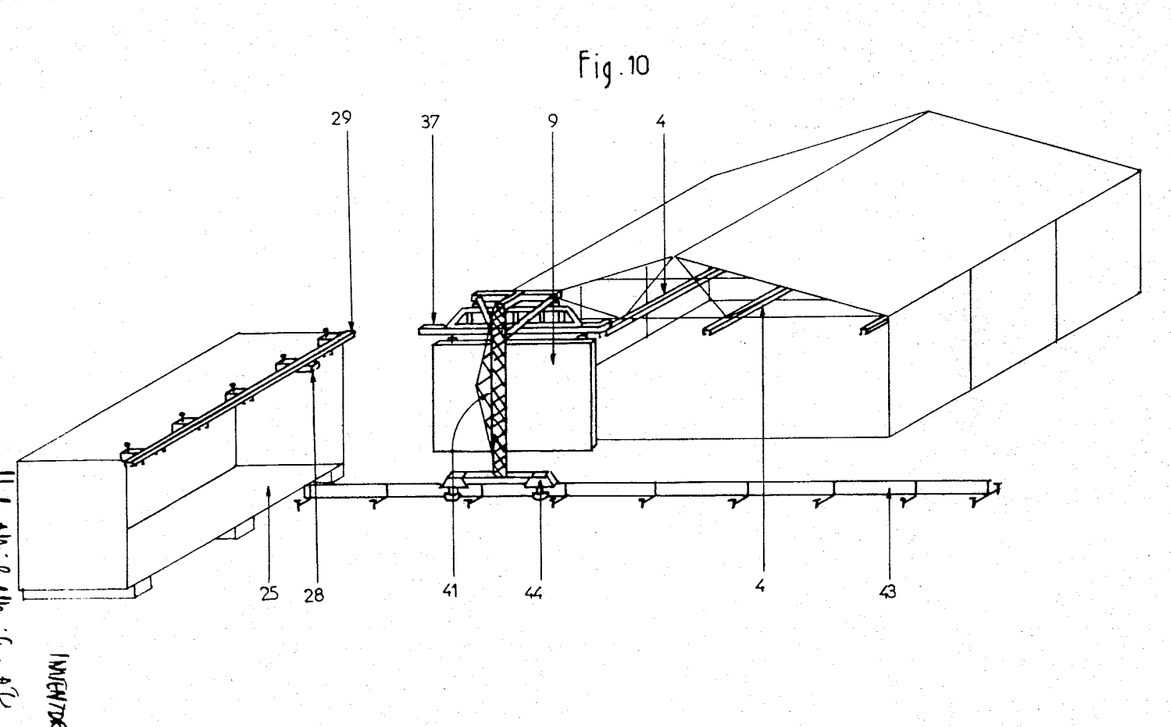
Figure 11:
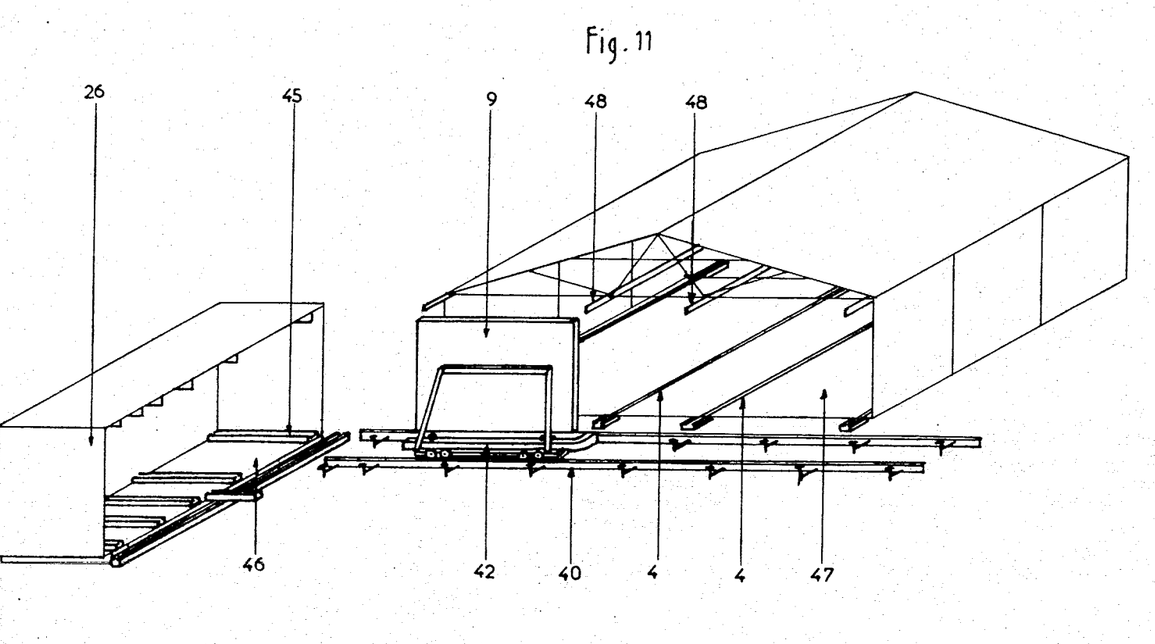

Other embodiments are shown in FIGS. 9, 10 and 11.

In FIG. 9, the posts and the rope are replaced by rolling rails 40, support 37 being mounted on a jib 41, itself fitted on to a traveler 42 able to move on the said rails 40.

FIG. 10 shows another embodiment in which the support 37 and jib 41 are mounted on a single rail 43, easier to put into position. Along this rail moves a traveler 44 which brings construction components 9 taken from the container 25 close to one of the rails 4.

Lastly, another embodiment is shown in FIG. 11, in which the construction components 9 are supported in the container 26 by rails 45 fixed, this time, on the floor 46 of the said container.

There again, either one or two rails 40 are put into position on the ground and the traveler 42 moves along them after each construction component has been slid onto the traveler. In the building, the rails are sunk into a concrete slab 47 and, consequently, the construction components are guided on them to their permanent position.

In the upper part of the building, only fixing elements 48 are provided, on which the upper parts of each construction component 9 will be stabilized, the traveler here again comprising curved rails allowing connection with the rails sunk into the building slab 47.

This arrangement, with a simple assembly, allows easy liaison between the container transporting the completed, factory-made construction components and the framework of the building already in place on the site.

It should be understood that the invention is not limited to the embodiments described and presented above; from these it is possible to foresee other methods and other embodiments which in no way exceed the scope of the invention.

What is claimed is:

1. In the construction of a building having a framework including vertical elements, roof elements, and finished wall panels, apparatus used in constructing the building comprising, in combination:

horizontal connecting parts forming rails, which within the constructed building form part of the framework and intereconnect the vertical elements and roof elements, means for storing external of said building at least one wall panel, said wall panel having rollers affixed thereto which are capable of sliding along the rails, and means for conveying the wall panel in an upright position from the means for storing to the rails for use in construction of the building.

2. The apparatus of claim 1 wherein said means for conveying comprises at least one guiding element disposed between the means for storing and the framework, and a traveler means including means for receiving the panel and means for coupling with the rails positioned in the framework.

3. The apparatus of claim 2 wherein said guiding element comprises two spaced posts and a rope strung between the posts, and said means for receiving the panel comprises a runner for sliding along the rope.

4. The apparatus of claim 3 comprising cables interlinking said runner and traveler means, wherein said cables are adjustable in length to vary the vertical position of said wall panel.

5. The apparatus of claim 4 wherein said rope is horizontally held above the framework.

6. The apparatus of claim 2 wherein the guiding element comprises a straight rail and two portions of curved rails fitted with the straight rail wherein said curved rails may be connected to the rails mounted in the framework of the building.

7. The apparatus of claim 6 wherein said curved rails are connected to horizontal rails disposed in parallel within the framework, said wall panel having rollers at each end for mating with respective curved rails thereby forming an inner partition of the building when in place.

8. The apparatus of claim 2 wherein the guiding element comprises at least one rail and the traveler means includes a jib capable of moving along said rail, said jib carrying the means for receiving the panel to be put in position in the framework.

9. The apparatus of claim 2 wherein said guiding element comprises runners supporting the panel and disposed along the base thereof.

10. The apparatus of claim 2 wherein the framework has a slab base and the guiding element comprises rails in which the panel slides, at least one end of one said rail being sunk into said slab.

11. The apparatus of claim 1 comprising tripods forming the junction points of the intermediary rails linking the means for storing and the framework.

12. The apparatus of claim 11 wherein each said tripod comprises a casing into which the ends of the guide rails fit.

13. The apparatus of claim 12 wherein each casing comprises two profiles joined together, the shape of these profiles defining a sliding groove fitting on the perpendicular projection formed below the platform of the tripod.

14. The apparatus of claim 13 wherein the height of each tripod is adjustable so as to take account of differences in ground level.

* * * * *